(12) United States Patent
Ueda et al.

(10) Patent No.: US 6,543,009 B1
(45) Date of Patent: Apr. 1, 2003

(54) SIGNAL PROCESSING APPARATUS

(75) Inventors: Yasushi Ueda, Ehime (JP); Takahiro Watanabe, Ehime (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/509,678

(22) PCT Filed: Oct. 19, 1999

(86) PCT No.: PCT/JP99/05745
§ 371 (c)(1),
(2), (4) Date: Jun. 15, 2000

(87) PCT Pub. No.: WO00/23896
PCT Pub. Date: Apr. 27, 2000

(30) Foreign Application Priority Data

Oct. 20, 1998 (JP) .......................................... 10-316942

(51) Int. Cl.⁷ ................................................ G06F 11/00
(52) U.S. Cl. ........................... 714/42; 714/45; 710/243; 711/150; 711/151
(58) Field of Search ................................ 714/42, 5, 45; 710/243, 240, 244; 711/150, 151

(56) References Cited

U.S. PATENT DOCUMENTS

| | | | | |
|---|---|---|---|---|
| 5,347,649 A | * | 9/1994 | Alderson | 709/312 |
| 5,715,435 A | * | 2/1998 | Ikei | 703/23 |
| 5,751,942 A | * | 5/1998 | Christensen et al. | 714/38 |
| 5,987,571 A | * | 11/1999 | Shibata et al. | 711/141 |
| 6,122,706 A | * | 9/2000 | Leong et al. | 711/108 |
| 6,249,847 B1 | * | 6/2001 | Chin et al. | 711/151 |
| 6,473,841 B1 | * | 10/2002 | Ueda et al. | 711/156 |
| 6,484,243 B1 | * | 11/2002 | Ueda et al. | 711/150 |

FOREIGN PATENT DOCUMENTS

| | | |
|---|---|---|
| EP | 0 316 609 | 5/1989 |
| EP | 0 381 059 | 8/1990 |
| JP | 61-262945 | 11/1986 |
| JP | 6-187256 | 7/1994 |

OTHER PUBLICATIONS

"Arbitration History Buffer", IBM Technical Disclosure Bulletin, US, IBM Corp. New York, vol. 36, No. 11, Nov. 1993, pp. 317–319.

* cited by examiner

Primary Examiner—Robert Beausoliel
Assistant Examiner—Yolanda L. Wilson
(74) Attorney, Agent, or Firm—McDermott, Will & Emery

(57) ABSTRACT

The invention relates to a signal processing apparatus comprising plural memories in an LSI and plural memory access blocks for accessing these memories, in which the cause can be analyzed easily in the event of a fault.

The signal processing apparatus 100 comprises a first arbitration block 150 for arbitrating the access right of a third memory access block 130 to a first built-in memory 160, a second arbitration block 180 for arbitrating to store the memory access history of the third memory access block 130 in a second built-in memory 190 which is not the same memory as the first built-in memory 160 executing the access of the third memory access block 130, and a trace control block 170 for controlling.

1 Claim, 4 Drawing Sheets

SIGNAL PROCESSING APPARATUS

TECHNICAL FIELD

The present invention relates to a signal processing apparatus having one or plural memories built in an LSI.

BACKGROUND ART

In a conventional signal processing apparatus, one way to utilize the bus information such as data and address appearing in the bus of the apparatus in system operation as fault analysis data in the event of fault taking place in the system of the apparatus is that the apparatus stores the bus information in an analyzing device such as logic analyzer. Other way is that the apparatus adds a tracing mechanism to the system, as disclosed in the Japanese Laid-open Patent No. 6-187256.

However, the recent advancement in the semiconductor technology is promoting development of LSI integrating various function blocks and memories on one chip by large scale, and therefore the conventional constitution of signal processing apparatus as mentioned above has the following problems.

Firstly, since memory interface signal is not issued outside of the LSI, the analyzer cannot be connected to the apparatus, and in the event of fault, the system cannot obtain necessary information for fault analysis. Secondly, to form the tracing mechanism inside the LSI, it gives rise to increase in the area of LSI and the cost because of requiring an exclusive control circuit for fault analysis and an exclusive trace memory.

DISCLOSURE OF THE INVENTION

To solve the above problems, the signal processing apparatus of the invention comprises plural memories provided in the LSI, plural memory access blocks for accessing the plural memories, plural arbitration blocks for arbitrating the access right of the memories, and one or plural trace control blocks for issuing a memory request signal for storing the access history of the memories. The arbitration block of this signal processing apparatus arbitrates the access right of each memory when the memory access request signals issued from the plural memory access blocks are entered in the arbitration blocks. The memory access request signal defined herein is the memory access request signal including attribute information to each memory, and the apparatus of the invention also can be achieved by comprising plural arbitration blocks. The trace control block issues a memory request signal for storing the access history of the memory on the basis of the result of arbitration by the arbitration block in other memory than the memory executing the requested access according to the memory access request signals issued from the plural memory access blocks. The signal processing apparatus can obtain easily necessary information for fault analysis, in the event of fault, without requiring any particular additional means such as exclusive control circuit for fault analysis or exclusive trace memory.

Thus, the signal processing apparatus of the invention does not require any exclusive trace memory for access history data in the system, and realizes to obtain information only by addition of a small control circuit such as trace control block. Moreover, this signal processing apparatus can obtain necessary information for fault analysis in the event of fault under the same condition as when trace processing is not executed, without increasing the load of the memory bus.

The signal processing apparatus stores the access history of the memory in other memory than the memory executing the requested access issued from the memory access block. In the event of fault, the signal processing apparatus reads out the access history from the other memory, so that the person in charge can analyze the cause of the fault easily.

BEST MODE FOR CARRYING OUT THE INVENTION

An embodiment of a signal processing apparatus of the invention is described below while referring to FIG. 1.

Figure 1:
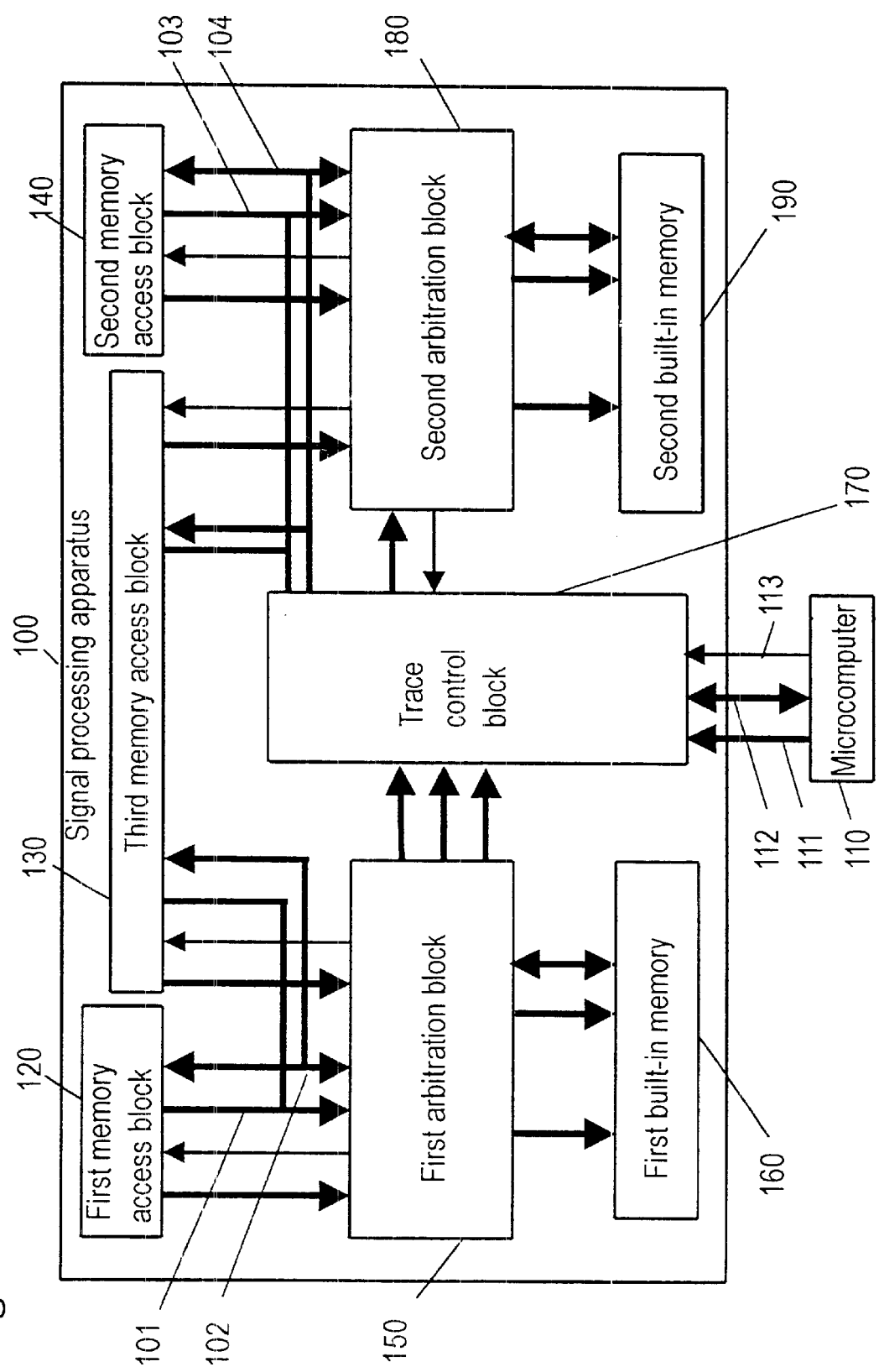
FIG. 1 is an electric block diagram in an embodiment of a signal processing apparatus of the invention.

In FIG. 1, a signal processing apparatus 100 is controlled from outside by a microcomputer 110. A first memory access block 120 reads or writes a first built-in memory 160 in the signal processing apparatus 100. A second memory access block 140 reads or writes a second built-in memory 190 in the signal processing apparatus 100. In the signal processing apparatus 100, a third memory access block 130 reads or writes the first built-in memory 160 or second built-in memory 190. A first arbitration block 150 arbitrates, in the signal processing apparatus 100, the access right of memory on the basis of each memory access request from the first memory access block 120 and the third memory access block 130, and accesses the first built-in memory 160. In actual operation, the first arbitration block. 150 accesses the first built-in memory 160 on the basis of the data of an arbitration address bus 101 when the first memory access block 120 or the third memory access block 130 is reading the first built-in memory 160. And the first arbitration block 150 accesses the first built-in memory 160 on the basis of the data of the arbitration address bus 101 and an arbitration data bus 102 and either of the buses, when writing. In the signal processing apparatus 100, a second arbitration block 180 arbitrates the access right of memory on the basis of each memory access request from the third memory access block 130 and second memory access block 140, and accesses the second built-in memory 190. In actual operation, the second arbitration block 180 accesses the second built-in memory 190 on the basis of the data of an arbitration address bus 103 when the third memory access block 130 or the second memory access block 140 is reading the second built-in memory 190, and on the basis of the data of the arbitration address bus 103 and an arbitration data bus 104 and either of the buses, when writing. A trace control block 170 controls, in the signal processing apparatus 100, for storing the memory access history in the second built-in memory 190 on the basis of the result of arbitration of the first arbitration block 150.

As an explanation of specific operation of this embodiment, the operation of the signal processing apparatus 100 for storing the access history of the third memory access block 130 to the first built-in memory 160 is described below.

The access history refers to the access block name, type of access, memory address and memory data. In each operation, the priority order of each memory access request in the first arbitration block 150 is first memory access block 120>third memory access block 130, and the priority order of each memory access request in the second arbitration block 180 is trace control block 170>third memory access block 130>second memory access block 140.

Further, the microcomputer 110 sets such an initial condition in the trace control block 170 as the access history of the third memory access block 130 to the first built-in memory 160 is stored in the second built-in memory 190, by using a microcomputer address bus 111, a microcomputer data bus 112, and a microcomputer control signal 113.

Figure 2A:
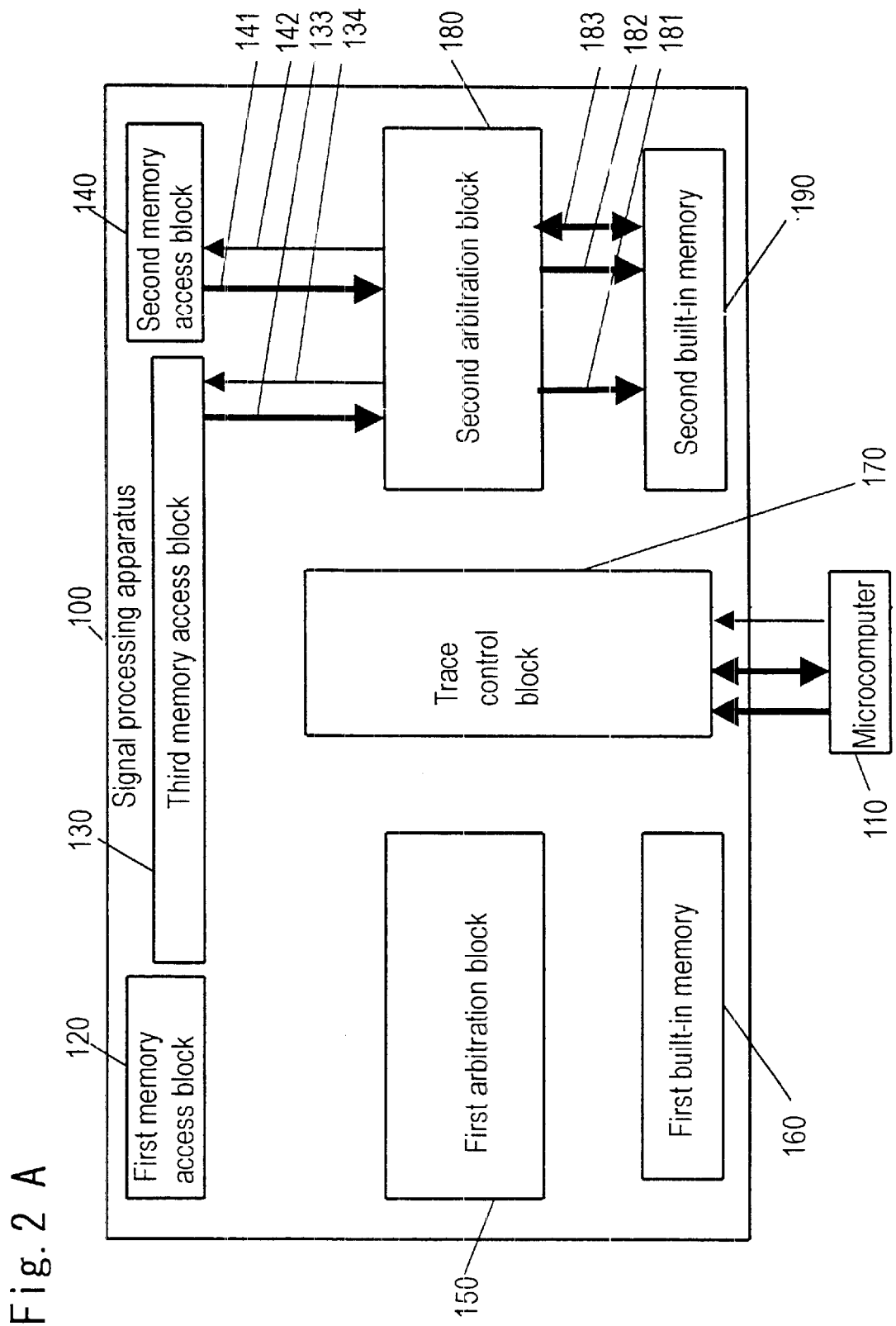
FIGS. 2A and B are explanatory diagrams of electric operation example when the trace control block does not execute trace processing in the embodiment of the signal processing apparatus of the invention.
Figure 2:
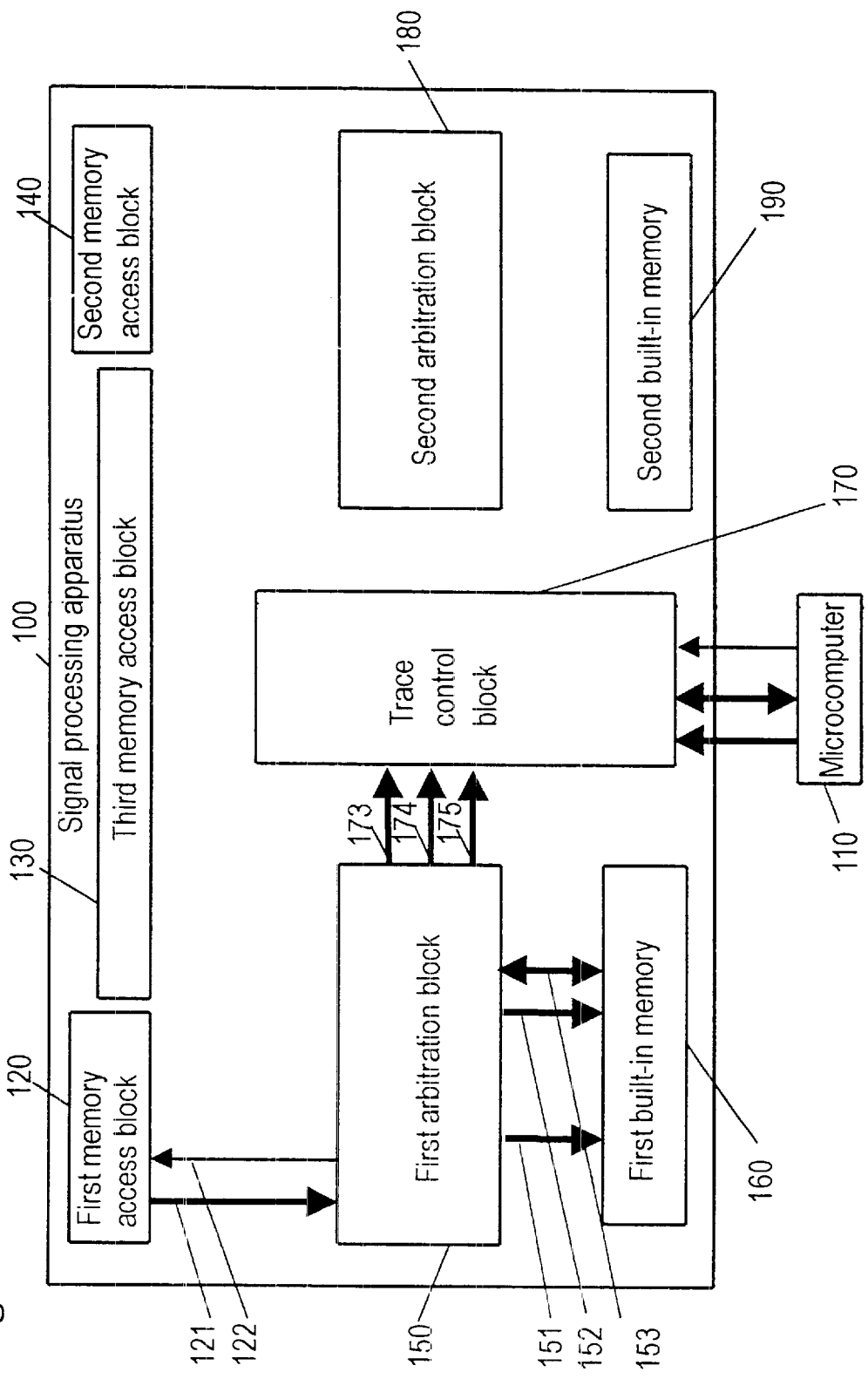

Referring to FIGS. 2A and B, the case of not executing the trace process of memory access history is described below.

First, in FIG. 2A, the signal processing apparatus 100 accepts the access of the third memory access block 130 to the second built-in memory 190, or the access of the second memory access block 140 to the second built-in memory 190, and the trace control block 170 does not execute the trace process.

While the third memory access block 130 is sending out a memory access request signal 133 and the second memory access block 140 is sending out a memory access request signal 141, both to the second arbitration block 180, the second arbitration block 180 judges the priority order of memory access requests, and sends back the memory access acknowledgement signal meaning that the memory access request signal is accepted, to the memory access block of the higher priority order. In this case, the second arbitration block 180 sends back a memory access acknowledgement signal 134 to the third memory access block 130 higher in the priority order of memory access request. At this time, the second arbitration block 180 executes the memory access request of the third memory access block 130 to the second built-in memory 190 by using a memory control signal 181, a memory address bus 182, and a memory data bus 183. When the memory access request is acknowledged, the third memory access block 130 withdraws the memory access request signal 133, and the second arbitration block 180 accepts a memory access request signal 141 of the second memory access block 140 having the second highest priority order of memory access request, and sends back a memory access acknowledgement signal 142. Afterwards, the same process as in the case of the third memory access block 130 is executed.

In FIG. 2B, the signal processing apparatus 100 accepts the access of the first memory access block 120 to the first built-in memory 160, and the trace control block 170 does not executes the trace process.

While the first memory access block 120 is sending out the memory access request signal 121 to the first arbitration block 150, the first arbitration block 150 sends back a memory access acknowledgement signal 122 to the first memory access block 120.

At this time, the first arbitration block 150 issues an arbitration result signal 173, and issues data of an arbitration result address bus 174 and an arbitration result data bus 175 to the trace control block 170. And the trace control block 170 checks if such information is matched with the initially set data so as to store the access history. The trace control block 170 sets initially so as to store the access history of the third memory access block 130 to the first built-in memory 160, and therefore does not execute the trace process. The first arbitration block 150 executes the memory access request of the first memory access block 120 to the first built-in memory 160 by using the memory control signal 151, memory address bus 152 and memory data bus 153. When the memory access request is acknowledged, the first memory access block 120 withdraws the memory access request signal 121.

Figure 3:
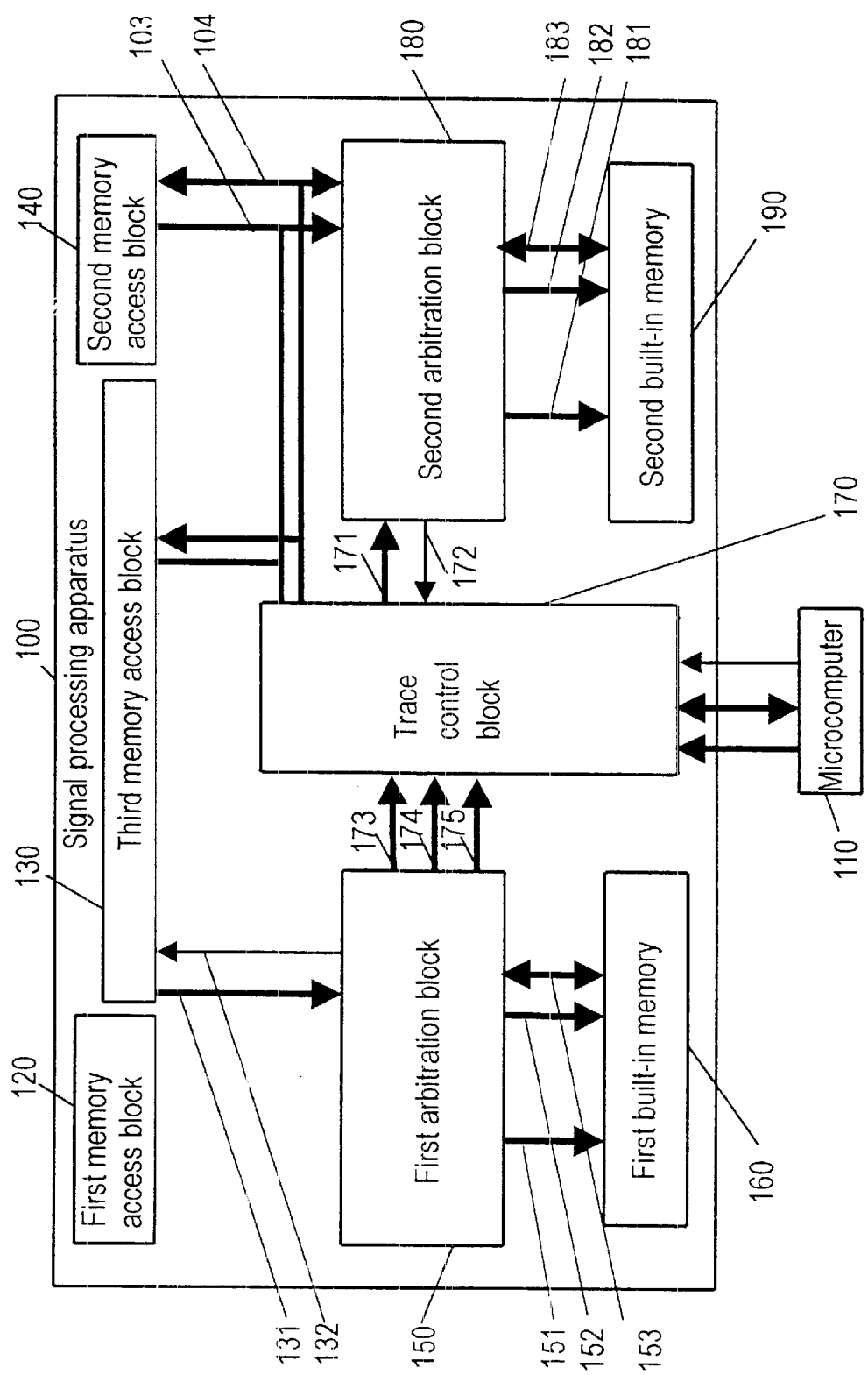
FIG. 3 is an explanatory diagram of electric operation example when the trace control block executes trace processing in the embodiment of the signal processing apparatus of the invention

FIG. 3 refers to a case in which the signal processing apparatus 100 accepts the access of the third memory access block 130 to the first built-in memory 160 and the trace control block 170 executes the trace process.

While the third memory access block 130 is sending out the memory access request signal 131 to the first arbitration block 150, the first arbitration block 150 sends back the memory access acknowledgement signal 132 to the third memory access block 130.

At this time, too, the first arbitration block 150 issues an arbitration result signal 173, and issues data of an arbitration result address bus 174 and an arbitration result data bus 175 to the trace control block 170. And the first arbitration block 150 executes the memory access request of the third memory access block 130 to the first built-in memory 160 by using the memory control signal 151, memory address bus 152 and memory data bus 153. The trace control block 170 checks if these pieces of information are matched with the initially set data so as to store the access history. Since the trace control block 170 sets initially so as to store the access history of the third memory access block 130 to the first built-in memory 160, coincidence of access history is detected. Detecting the coincidence, the trace control block 170, in order to trace the access history, generates access history data from the arbitration result signal 173 and both data of the arbitration result address bus 174 and the arbitration result data bus 175 including attribute information. And the trace control block 170 sends out a memory access request signal 171 for trace, address data to the arbitration address bus 103 and data to the arbitration data bus 104. The second arbitration block 180, when accepting the request of trace control block 170, sends back a memory access acknowledgement signal 172 for trace to the trace control block 170. At this time, the second arbitration block 180 executes the memory access request of the trace control block 170 to the second built-in memory 190 by using the memory control signal 181, memory address bus 182 and memory data bus 183.

Repeating the same operation; thereafter, at every access of the third memory access block 130 to the first built-in memory 160, the trace control block 170 and the second arbitration block 180 execute the trace process of the access history data to the second built-in memory 190.

The explanation of this embodiment relates to an example of trace process of access history data of one memory access block, but this signal processing apparatus is also applicable to simultaneous trace processing of plural memory access blocks.

INDUSTRIAL APPLICABILITY

The signal processing apparatus of the invention does not require any exclusive trace memory for access history data in the system, and is capable of obtaining fault information under the same condition as when trace processing is not executed merely by addition of a small control circuit, and therefore system fault occurrence can be reproduced easily, and cause can be analyzed smoothly, and hence the signal processing apparatus of the invention has an outstanding industrial applicability.

What is claimed is:

1. A signal processing apparatus comprising:

plural memories provided in an LSI, plural memory access blocks for accessing the plural memories, plural arbitration blocks for arbitrating the access right of each memory by receiving each memory access request signal issued from said memory access blocks, and accessing each memory, and one or plural trace control blocks for issuing a memory access request signal for storing the access history of the memories on the basis of the result of arbitration by said arbitration blocks in other memory than the memory executing the requested access according to the memory access request signals from said memory access blocks.

* * * * *